United States Patent
Schürmann et al.

(10) Patent No.: US 9,073,517 B2
(45) Date of Patent: Jul. 7, 2015

(54) TRANSVERSE FORCE-REDUCING SUPPORT DEVICE

(71) Applicant: Manitowoc Crane Group France SAS, Dardilly Cedex (FR)

(72) Inventors: Johannes Schürmann, Jever (DE); Oliver Engelbrecht, Sande (DE)

(73) Assignee: Manitowoc Crane Group France SAS, Dardilly Cedex (FR)

( * ) Notice: Subject to any disclaimer, the term of this patent is extended or adjusted under 35 U.S.C. 154(b) by 13 days.

(21) Appl. No.: 13/892,097

(22) Filed: May 10, 2013

(65) Prior Publication Data
US 2013/0300094 A1 Nov. 14, 2013

(30) Foreign Application Priority Data
May 14, 2012 (DE) .......................... 10 2012 208 058

(51) Int. Cl.
*B60S 9/02* (2006.01)
*B60S 9/12* (2006.01)
*B66C 23/80* (2006.01)

(52) U.S. Cl.
CPC .. *B60S 9/12* (2013.01); *B66C 23/80* (2013.01)

(58) Field of Classification Search
CPC ................. B60S 9/08; B60S 9/02; B60S 9/04
USPC ....................... 280/766.1, 763.1, 764.4, 765.1
See application file for complete search history.

(56) References Cited

U.S. PATENT DOCUMENTS

| 1,272,110 | A | * | 7/1918 | Robinson ....................... 212/302 |
| 3,702,181 | A | * | 11/1972 | Keller, Jr. et al. ............. 254/423 |
| 4,067,595 | A | * | 1/1978 | Vigerie ...................... 280/766.1 |
| 4,240,334 | A | * | 12/1980 | Crosser ............................. 92/23 |
| 4,266,809 | A | * | 5/1981 | Wuerflein .................. 280/766.1 |
| 4,446,976 | A | * | 5/1984 | Imerman et al. .............. 212/304 |
| 4,449,734 | A | * | 5/1984 | Cory ........................... 280/766.1 |
| 4,454,952 | A | * | 6/1984 | McGhie ........................ 212/302 |
| 6,341,705 | B1 | * | 1/2002 | Kaspar ......................... 212/302 |
| 2006/0267326 | A1 | | 11/2006 | Richard | |

FOREIGN PATENT DOCUMENTS

| CN | 201800687 U | 4/2011 |
| DE | 94 19 201 U1 | 4/1995 |
| JP | 09071227 A | 3/1997 |
| JP | 11157780 A | 6/1999 |
| JP | 2008307925 A | 12/2008 |
| JP | 2010222138 A | 10/2010 |

OTHER PUBLICATIONS

Search Report EP13163317.4, dated Aug. 9, 2013 (related to priority document).

* cited by examiner

*Primary Examiner* — Hau Phan
(74) *Attorney, Agent, or Firm* — Craig Buschmann; Brinks Gilson & Lione

(57) ABSTRACT

A support device for a mobile lifting machine, in particular a vehicle crane, comprises a carrier support coupled to the vehicle chassis, a piston rod coupled to the carrier support and movable relative to the carrier support, and a support disc coupled to the piston rod, wherein the support device is configured such that it allows a movement of the support disc relative to the carrier support in a direction perpendicular to the longitudinal axis (L) of the piston rod.

9 Claims, 2 Drawing Sheets

TRANSVERSE FORCE-REDUCING SUPPORT DEVICE

RELATED APPLICATIONS

The present patent document claims the benefit of priority to German Patent Application No. 10 2012 208 058.9, filed May 14, 2012, and entitled "Transverse Force-Reducing Support Device," the entire contents of each of which are incorporated herein by reference.

BACKGROUND

1. Technical Field

The present invention relates to a support device such as is used in mobile lifting machines, in particular in vehicle cranes, in order to support them during operation. The present invention also relates to a mobile lifting machine, in particular a vehicle crane, comprising at least one such support device.

2. Background Information

Modern mobile cranes are used for lifting increasingly heavier loads to ever greater heights. The demand for using an efficient mobile crane which exhibits as low an inherent weight as possible, in order to reduce logistical costs, is increasing in the same way. A particular aim is to provide a mobile crane which exhibits as high a bearing load as possible on as few axles as possible, without exceeding the permissible axial loads. This has a favourable effect on the maneuverability of the mobile crane during transport on the one hand, and a lowering effect on the overall costs of the crane on the other. This stated object can also be transposed, unchanged, to other mobile lifting machines, for example movable working platforms or hydraulic rescue vehicles, which are supported by means of support devices during operation.

Such support devices consist substantially of a carrier support which can be extended or pivoted out of the vehicle chassis, and a support cylinder which is arranged in the region of the end of the carrier support pointing away from the vehicle chassis. The support cylinder in turn comprises a hydraulic cylinder and a piston rod which can be extended out of the hydraulic cylinder. In order to support the lifting machine, the piston rod is extended out of the carrier support, such that the lifting machine comprising a plurality of support devices is ultimately raised together with the carrier supports. Due to the design, the carrier supports are deformed during the support procedure by the application of force by the support cylinders. The resultant sagging at the outer end of the carrier support generates a transverse force that causes the piston rod to be deformed. The transverse force has to be accommodated by the piston rod as an additional load, which increases the calculated total force that has to be accommodated by the piston rod and taken into account when designing the piston rod.

BRIEF SUMMARY

The present invention is based on the object of overcoming the described disadvantages of the prior art. In particular, the intention is to reduce the inherent weight of the support device and therefore the inherent weight of the lifting machine and/or vehicle crane as a whole.

This object is solved by the subject-matter of co-ordinated patent claims 1 and 10, wherein the sub-claims define preferred embodiments of the present invention.

The support device in accordance with the invention comprises: a carrier support which is coupled to the vehicle chassis; a piston rod which is coupled to the carrier support and can be moved relative to the carrier support;
a support disc which is coupled to the piston rod,
wherein the support device is configured such that it allows a movement of the support disc, directed perpendicular to the longitudinal axis of the piston rod, relative to the carrier support.

In other words, the support disc is given the option during support of being moved and/or aligned relative to the carrier support and perpendicular to the longitudinal axis of the piston rod. If a crane is being supported on the ground, this movement is performed in a substantially horizontal plane or direction, respectively, since the longitudinal axis of the piston rod extends substantially vertically in this case.

In this way, the support device in accordance with the invention forms a sort of loose bearing which compensates for the deformation in the carrier supports. As noted, the deformation is caused by the application of a force by the support cylinders onto the carrier supports, which ultimately causes the transverse force that acts on the piston rods. Eliminating the transverse force acting on the piston rod enables the piston rod to be given smaller dimensions, such that it is lighter and consequently has a positive effect on the overall weight of the support device and therefore the overall weight of the lifting machine. Eliminating the transverse force likewise prevents the distorting effect of the transverse force on any support pressure indicator, which improves the accuracy measured by the support pressure indicator. With the aid of a support pressure indicator, it is possible to ascertain whether a crane is being properly supported. The supporting force is deduced from the pressure of the hydraulic oil for the hydraulically operated support cylinders, The transverse forces mentioned likewise have to be taken into account because they can distort the actual supporting force indicated because some of the supporting force is dissipated as a frictional force via the guide for the support cylinder.

The movement of the support disc which is directed perpendicular to the longitudinal axis of the support cylinder can then comprise rotational and/or translational components. All that is important is that the support disc is given a certain degree of freedom relative to the carrier support in order to prevent or at least reduce the transverse forces acting on the support cylinder.

In accordance with a preferred embodiment of the present invention, the support disc automatically moves into a base position when the support device is not being used. In other words, the support disc is always situated in the same base position before the support procedure so that it can be moved out of its base position during the support procedure, i.e. as soon as elastic deformation of the carrier support sets in.

In accordance with another preferred embodiment of the present invention, the movement of the support disc relative to the carrier support is allowed either by means of the coupling between the piston rod and the hydraulic cylinder or carrier support, respectively, or the coupling between the support disc and the piston rod or by a combination of the two couplings. It is therefore precisely the couplings and/or interfaces between the individual components of the support device which would enable the movement of the support disc relative to the support cylinder. In principle, however, it is likewise conceivable to provide devices, which individually or together enable the support disc to move relative to the carrier support as described above, outside of the couplings and/or interfaces on the components themselves, for example the support disc or the support cylinder.

In accordance with one preferred embodiment, the coupling between the support disc and the support cylinder allows a rotational movement of the support disc relative to the support cylinder, wherein in accordance with another preferred embodiment, only such a rotational movement is allowed. In this way, the support disc can adapt to uneven ground, without causing transverse forces which act on the piston rod. A spherical bearing is particularly preferred as the coupling between the support disc and the piston rod.

In accordance with another preferred embodiment, the piston rod is moved and/or operated hydraulically. A hydraulic cylinder can be provided in the carrier support for this purpose, in which the piston rod is guided as a piston and extended by means of hydraulic fluid introduced into the cylinder space or retracted by means of hydraulic fluid expelled from the cylinder space, respectively. The piston rod can however also comprise a separate piston which assumes the guiding and sealing function within the cylinder and is coupled to the piston rod.

In accordance with another preferred embodiment, the coupling between the piston rod and the hydraulic cylinder or carrier support, respectively, allows the piston rod to rotate about its central longitudinal axis within the hydraulic cylinder. This function can be performed very well by means of a hydraulic cylinder piston rod pairing which exhibits a circular cross-section. The piston rod and/or its piston can then be rotated within the hydraulic cylinder of the carrier support, which enables a crucial advantage which is described further below.

In accordance with another preferred embodiment, the spherical bearing is spaced from the longitudinal axis of the piston rod in a projection along said longitudinal axis. In other words, the spherical bearing is arranged eccentrically with respect to the central longitudinal axis of the piston rod.

The eccentric arrangement of the spherical bearing, together with the rotational freedom of the piston rod about its central longitudinal axis, enables a movement of the spherical bearing perpendicular to the longitudinal axis of the piston rod. The support disc, which is coupled to the piston rod by means of the spherical bearing, can therefore also follow this movement and therefore obtains a degree of freedom perpendicular to the longitudinal axis of the piston rod. A support device configured in this way can therefore assume the function of a loose bearing which compensates for the load-induced deformation of the carrier support and therefore prevents the associated transverse force on the piston rod.

In accordance with another preferred embodiment, the piston rod is connected to the piston and rotationally fixed about its longitudinal axis, wherein the base of the piston in particular comprises a cavity into which a corresponding protrusion in the region of the base of the hydraulic cylinder—which surrounds the piston—can move. The cavity and the protrusion are configured such that when the protrusion moves into the cavity the piston rod rotates about its longitudinal axis into a base position. If the piston rod does not comprise a piston and/or itself assumes the sealing and guiding function within the hydraulic cylinder of the carrier support, then it can comprise such a cavity itself instead of the piston. The configuration of the cavity and the protrusion provides the function of automatically resetting the support disc into a base position. It is however likewise conceivable to provide other elements which assume the resetting function, for example one or more spring elements which are tensed when the support disc is moved out of its base position and which, when discharged, move the support disc back into its base position again.

Another aspect of the present invention relates to a mobile lifting machine, in particular a vehicle crane, comprising at least one and preferably precisely one support device such as has been described above for each pair of support devices, where support devices are arranged in pairs on both sides of the lifting machine and opposite each other. In a vehicle crane comprising four support devices arranged in pairs in the front and rear region on both sides of the vehicle crane, one "loose bearing" support device in accordance with the invention can preferably be provided for each pair of support devices, while the other support device in each of the two pairs is a conventional support device which exhibits the function of a fixed bearing.

A particularly preferred embodiment of the present invention is explained in more detail on the basis of the enclosed figures. The invention can comprise any of the features described here, individually and in any expedient combination.

DETAILED DESCRIPTION

Figure 1A:
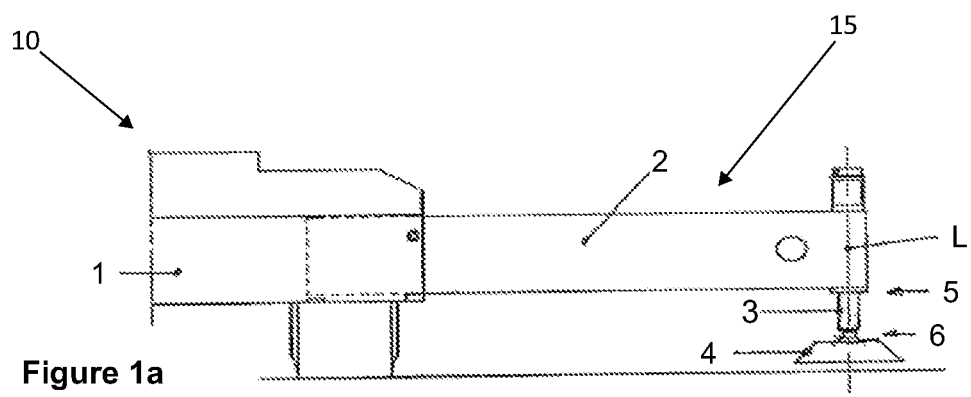
FIGS. 1a to 1c illustrates a conventional support device in its unburdened and burdened state, and a conventional spherical bearing.

FIG. 1a shows the vehicle chassis 1 of a vehicle crane 10, out of which the carrier support 2 of a support device 15 has been extended. The piston rod 3 is also shown, which can be extended vertically downwards out of the hydraulic cylinder 5 of the carrier support 2 and is situated at the end of the carrier support 2 pointing away from the vehicle chassis 1. The lower end of the piston rod 3 is connected to a support disc 4 via a spherical bearing 6, wherein the spherical bearing 6 allows rotational degrees of freedom of the support disc 4 relative to the piston rod 3. The piston rod 3 is mounted in a hydraulic cylinder 5 of the carrier support 2.

Figure 1B:
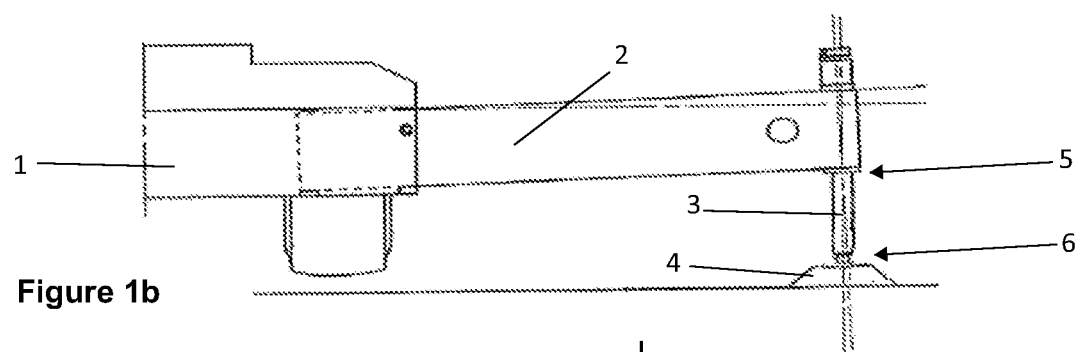

As shown in FIG. 1b, the carrier support 2 and ultimately also the vehicle chassis 1 is raised by extending the piston rod 3, wherein the occurring weight forces deform the carrier support 2. Since the support disc 4 remains at its position on the ground, the piston rod 3 is deformed due to the occurring transverse forces. The consequence of this is in turn that the piston rod 3 has to be dimensioned such that the occurring transverse forces can be accommodated. The transverse forces affect the accuracy of the measurement of the supporting force, an affect that typically cannot be prevented.

Figure 1C:
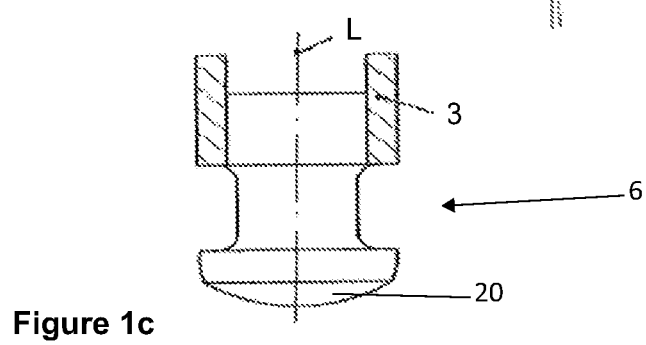

FIG. 1c shows the spherical cap of a conventional spherical bearing which is arranged in the lower region of the piston rod 3.

Figure 2A:
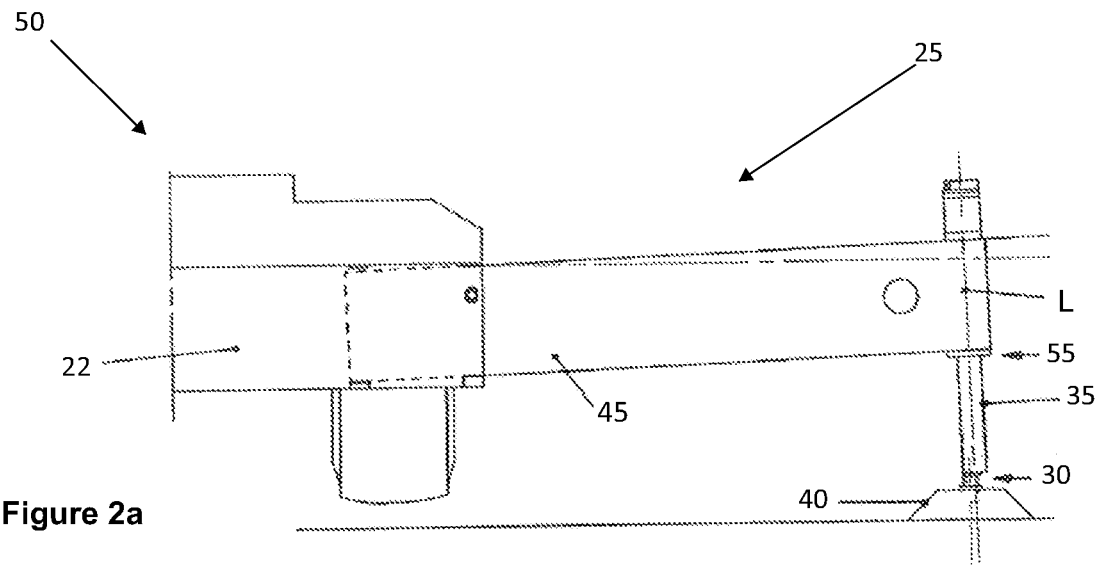
FIG. 2a illustrates the support device in accordance with the invention in its burdened state.

FIG. 2a shows a vehicle chassis 22 that includes a support device 25 in accordance with the invention in its burdened state. A spherical bearing 30 which is fastened to the piston rod 35 is arranged eccentrically with respect to the longitudinal axis L of the piston rod 35, such that a transverse force which is transmitted onto the piston rod 35 by the support disc 40 causes a rotational movement of the piston rod 35. Once the support disc 40 has touched the ground during the support procedure, the carrier support 45 begins to be raised within its clearance towards the crane 50. In accordance with the invention, the application of the transverse force turns the piston rod 35, wherein the eccentric spherical bearing 30 remains on the resting support disc 40 and merely completes a rotational movement in the corresponding receptacle of the support disc 40, such that the piston rod 35 yields on a circular trajectory as viewed from the support disc 40. The piston rod 35 can thus equalise the lateral offset caused by the elastic deformation of the carrier support 45 by turning within the hydraulic cylinder 55 of the carrier support 45 so that the piston rod 35 can effectively be prevented from being deformed.

Figure 2B:
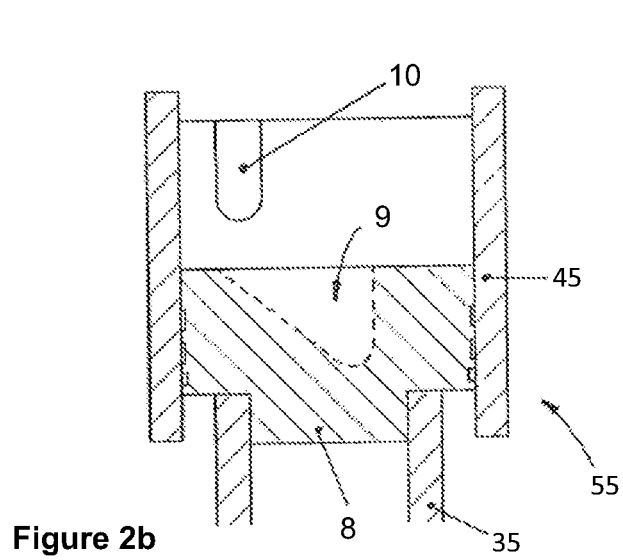
FIG. 2b illustrates the coupling between the piston rod and the hydraulic cylinder or carrier support, respectively, in accordance with the invention.

FIG. 2b shows the coupling between the piston rod 35 and the carrier support 45 in accordance with the invention, which generates an automatic resetting movement of the piston rod 35 into a base position when the piston rod 35 is retracted. To this end, the piston 8 arranged at the upper end of the piston rod 35 comprises a cavity 9 into which the protrusion 10 on the upper base of the hydraulic cylinder 55 can move in order to cause the piston 8 to turn together with the piston rod 35 within the hydraulic cylinder 55 of the carrier support 45.

Figure 2C:
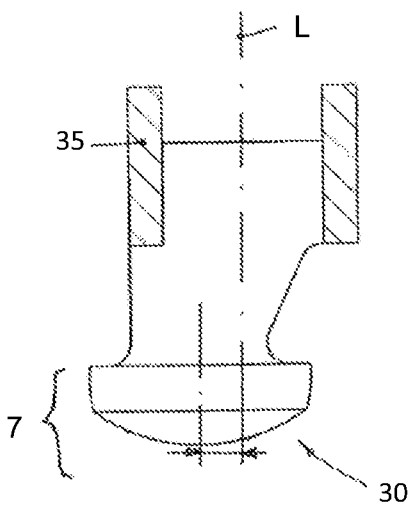
FIG. 2c illustrates the coupling between the support disc and the piston rod in accordance with the invention.

FIG. 2c shows the coupling between the support disc 40 (not shown) and the piston rod 35, wherein only the upper joint portion 7, i.e. the spherical cap 7, of the spherical joint or bearing 30 is shown. The eccentricity of the spherical joint or bearing 30 relative to the longitudinal axis L of the piston rod 35 can also be seen, which together with the rotational degree of freedom of the piston 8 or support cylinder 35, respectively, within the hydraulic cylinder 55 of the carrier support 45 allows a movement of the support disc 40 relative to the carrier support 45.

The support procedure using the support device 25 in accordance with the invention progresses in the following order. The mobile crane 50 is initially resting on its wheels, wherein the piston rods 35 are retracted into the hydraulic cylinders 55 and the support discs 40 are suspended via the spherical joints or bearings 30 on the piston rods 35. The spherical joints or bearings 30 are initially still situated in their base position. The piston rods 35 are extended until the support discs 40 touch the ground, wherein the carrier supports 45 are lifted as soon as the piston rods 35 are extended further, which create a lateral offset between the support disc 40 and the piston rods 35. The transverse force thus created causes the piston rods 35 to turn within the hydraulic cylinders 55, wherein this effect increases until the wheels of the crane 50 disengage from the ground.

The takedown procedure correspondingly progresses in the reverse order. The mobile crane 50 is resting on its carrier supports 45, wherein the wheels are not touching the ground. The spherical joints or bearings 30 on the piston rods 35 are situated in their turned position, which prevents transverse forces on the piston rod 35. When the piston rods 35 are retracted, the carrier supports 45 are lowered at the outer end as soon as the wheels touch the ground due to the abating elastic deformation of the carrier supports 45, wherein a lateral offset between the support disc 40 and the piston rod 35 is created. The transverse force thus created causes the piston rod 35 to rotate back. When the piston rods 35 are retracted further until they abut, they are rotated back into their base position together with the spherical joints 7 and the support discs 40 by the cavity 9 in the base of the piston 8 and the protrusion 10 in the upper base of the hydraulic cylinder 55.

The invention claimed is:

1. A support device for a mobile lifting machine comprising:
a carrier support coupled to a vehicle chassis;
a piston rod coupled to the carrier support via a hydraulic cylinder coupled to the piston rod and positioned between the carrier support and the piston rod, and movable relative to the carrier support;
a support disc coupled to the piston rod; and,
a spherical bearing positioned between the support disc and the piston rod;
wherein an eccentricity of the spherical bearing relative to a longitudinal axis (L) of the piston rod in a projection along the longitudinal axis (L) is configured to cause the piston rod to rotate around the longitudinal axis (L) and, in turn, to cause a movement of the support disc directed relative to the carrier support in a direction perpendicular to the longitudinal axis (L) of the piston rod.

2. The support device in accordance with claim 1, wherein the support disc automatically moves into a base position when the piston rod is retracted.

3. The support device in accordance with claim 1, wherein the bearing allows only rotational movement of the support disc relative to the piston rod.

4. The support device in accordance claim 1, wherein the piston rod is moved hydraulically by a piston coupled to the piston rod.

5. The support device in accordance with claim 4, wherein the piston rod is rotationally coupled about the longitudinal axis (L) to the piston, wherein the piston further comprises a cavity, and wherein the hydraulic cylinder surrounds the piston and further comprises a protrusion corresponding to the cavity and configured to move into the cavity so that when the protrusion moves into the cavity the piston and piston rod rotate about the longitudinal axis (L) into a base position.

6. The support device in accordance with claim 1, wherein the hydraulic cylinder allows rotational movement of the piston rod about the longitudinal axis (L).

7. A mobile lifting machine comprising:
a chassis;
at least one pair of support devices, wherein at least one support device of each pair of support devices includes:
a carrier support coupled to the chassis;
a piston rod coupled to the carrier support via a hydraulic cylinder coupled to the piston rod and positioned between the carrier support and the piston rod, and movable relative to the carrier support;
a support disc coupled to the piston rod; and,
a spherical bearing positioned between the support disc and the piston rod;
wherein an eccentricity of the spherical bearing relative to a longitudinal axis (L) of the piston rod in a projection along the longitudinal axis (L) is configured to cause the piston rod to rotate around the longitudinal axis (L) and, in turn, to cause a movement of the support disc directed relative to the carrier support in a direction perpendicular to the longitudinal axis (L) of the piston rod.

8. The mobile lifting machine of claim 7, further comprising a vehicle crane.

9. The mobile lifting machine of claim 7, wherein each support device of the at least one pair is positioned opposite each other on the chassis.

* * * * *